March 9, 1937. W. A. DARRAH 2,073,144
PROCESS OF HEAT APPLICATION AND EQUIPMENT THEREFOR
Filed Nov. 12, 1934 4 Sheets-Sheet 1

William A. Darrah
Inventor.

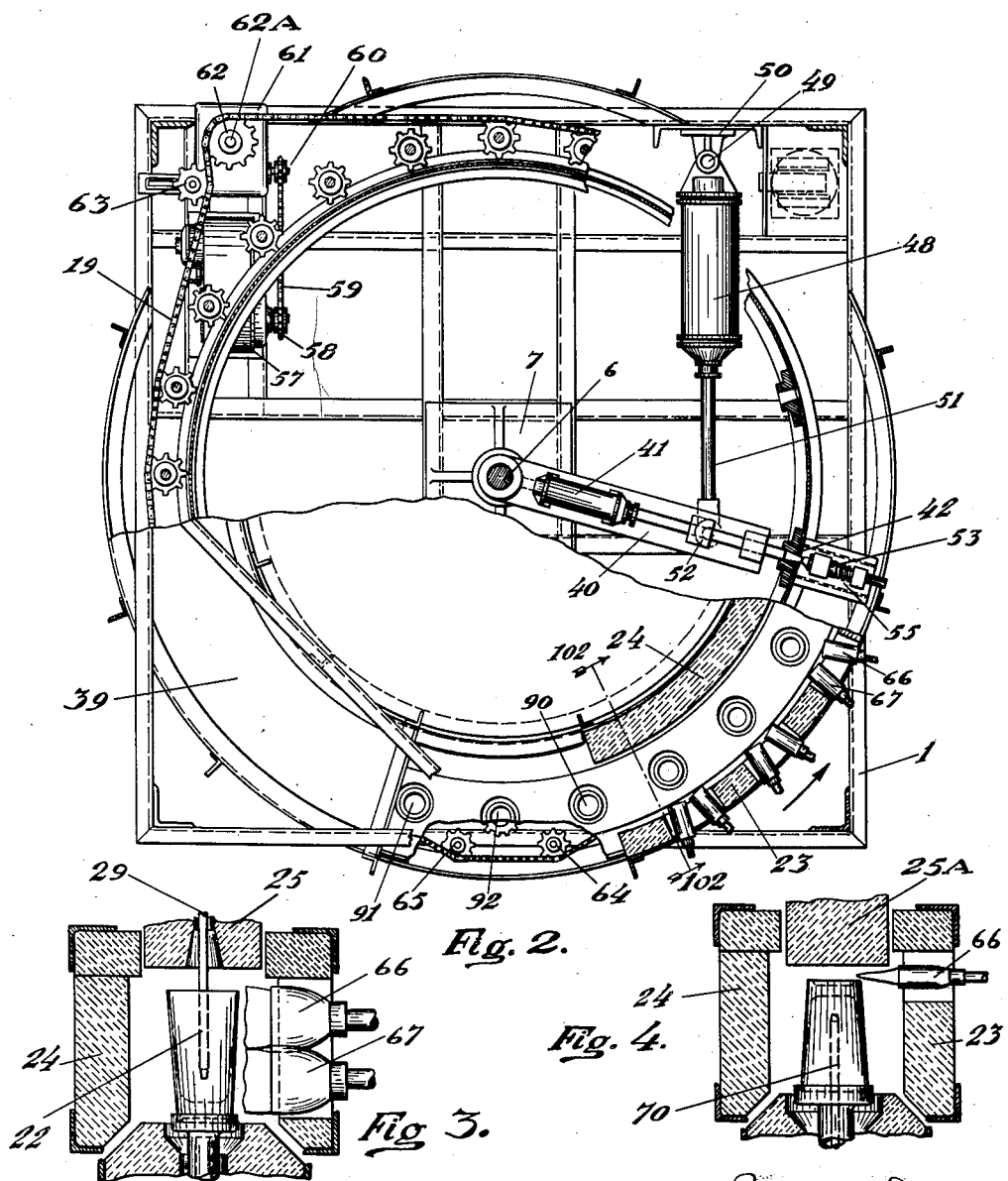

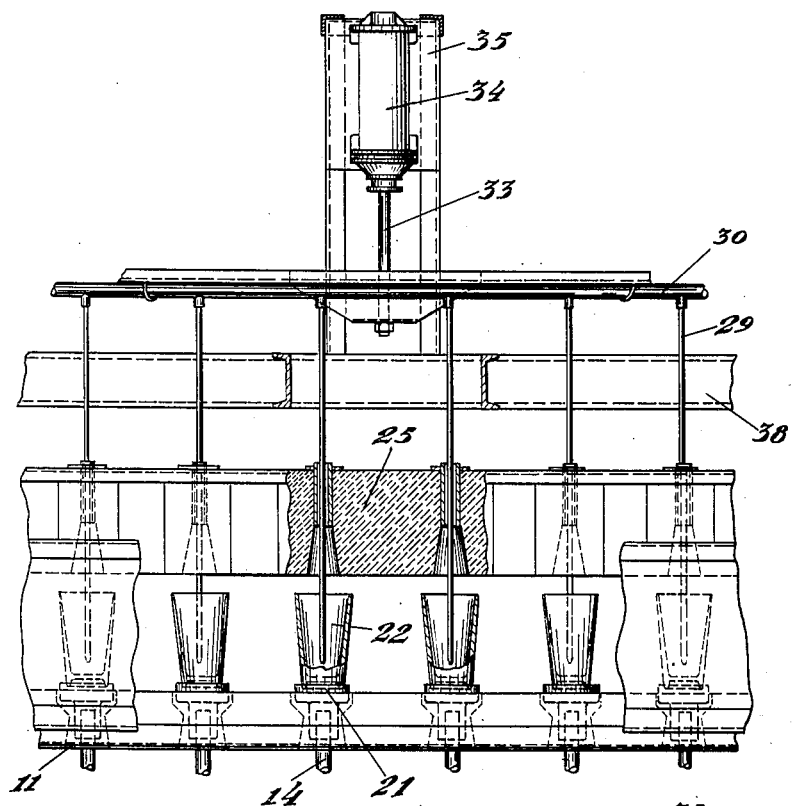
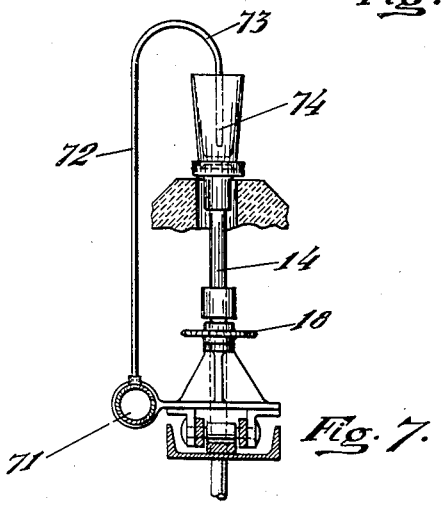
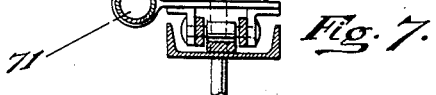

Patented Mar. 9, 1937

2,073,144

UNITED STATES PATENT OFFICE 2,073,144

PROCESS OF HEAT APPLICATION AND EQUIPMENT THEREFOR

William A. Darrah, Chicago, Ill.

Application November 12, 1934, Serial No. 752,575

10 Claims. (Cl. 49—7)

This invention relates to methods, process and equipment for applying heat and primarily in connection with strongly heating the surface of an article with the resulting partial fusion, change in crystal structure or other change of surface conditions.

One important field in which this invention may be applied with excellent results is in connection with the surface fusion or so-called fire polishing of glass articles, although it should be understood that I do not wish to confine my invention to the treatment of glass only as porcelains, stone ware, metal and other articles may on occasion be treated with the equipment and process here disclosed.

In the case of the treatment of glass ware, my invention permits the production of an extremely smooth, partially fused surface which may have a high brilliance and attractive effect. In the case of glasses containing certain compounds which change their state by heat, it is possible to use my process and equipment in producing iridescent markings, color effects, etc. My invention may also be applied to creating a smoother surface by reducing or eliminating surface markings, scratches, dents or chips. Such a treatment makes it possible to cast or press a glass article in a relatively rough mold and yet after subjecting it to treatment with my equipment and process the finished article may be remarkably smooth and mold markings largely eliminated.

It will be evident, therefore, that the process and equipment may markedly affect either the physical or chemical state of the material treated or both.

In view of the wide range of application of this process the description here given will be confined primarily to the treatment of glass articles, but it should be understood that this limitation is solely for purposes of clarifying the description as it will be obvious that the process and equipment may be employed on many other articles and in various other ways.

It may be stated, therefore, that some of the objects of my invention are to simply, cheaply and uniformly change the condition of the surface of the article being treated to develop a desired condition.

In case of glass ware the objects of my invention are to produce a smooth, polished, brilliant surface in a short time with a minimum of hand labor and with a maximum of uniformity.

Other objects of my invention are to produce a surface free from mold marks and other imperfections and having the desired physical and chemical textures, and without sagging or distortion.

For example my process may be employed for coating an article with glass or enamel as for example a steel or metal article given a coat of unfired enamel (by dipping or spraying from a water solution) may be subjected to treatment in accordance with my invention and the result will be a smooth, glazed surface over the steel or metal. In the same way, porcelain, china ware, clay or various cements may be given a rapid surface heating in order to modify the condition of the surface.

Another object of my invention is to provide a means by which the exterior surface of an article may be properly heated to cause fusion, polishing or other change in characteristics while at the same time maintaining the interior of the article at a lower temperature.

A specific application of this phase of my invention consists in heating the exterior of a glass article such as a tumbler or beer mug while maintaining the inside of the article at a lower temperature so that distortion does not take place.

Other objects of my invention will be apparent from the drawings, description and claims attached hereto.

Referring to the drawings, Figure 1 shows a side elevation partly cut away of one form of my invention, while Figure 2 shows a plan view of my device with certain sections cut away to disclose the interior construction more clearly.

Figure 3 shows a section taken along the line 102—102 in Figure 2, while

Figure 4 shows a section taken transversely through the view shown in Figure 2, said section showing an article being polished in an inverted position with cooling air supplied from the underside of the spindle.

Figure 5 shows a fragmentary front elevation partly in section and taken through a portion of the zone including the internal cooling device.

Figure 6 shows a modification of the air inspirating device shown in general in Figure 1, while Figure 7 shows an additional form arranged to accomplish the same general result.

Figure 1:
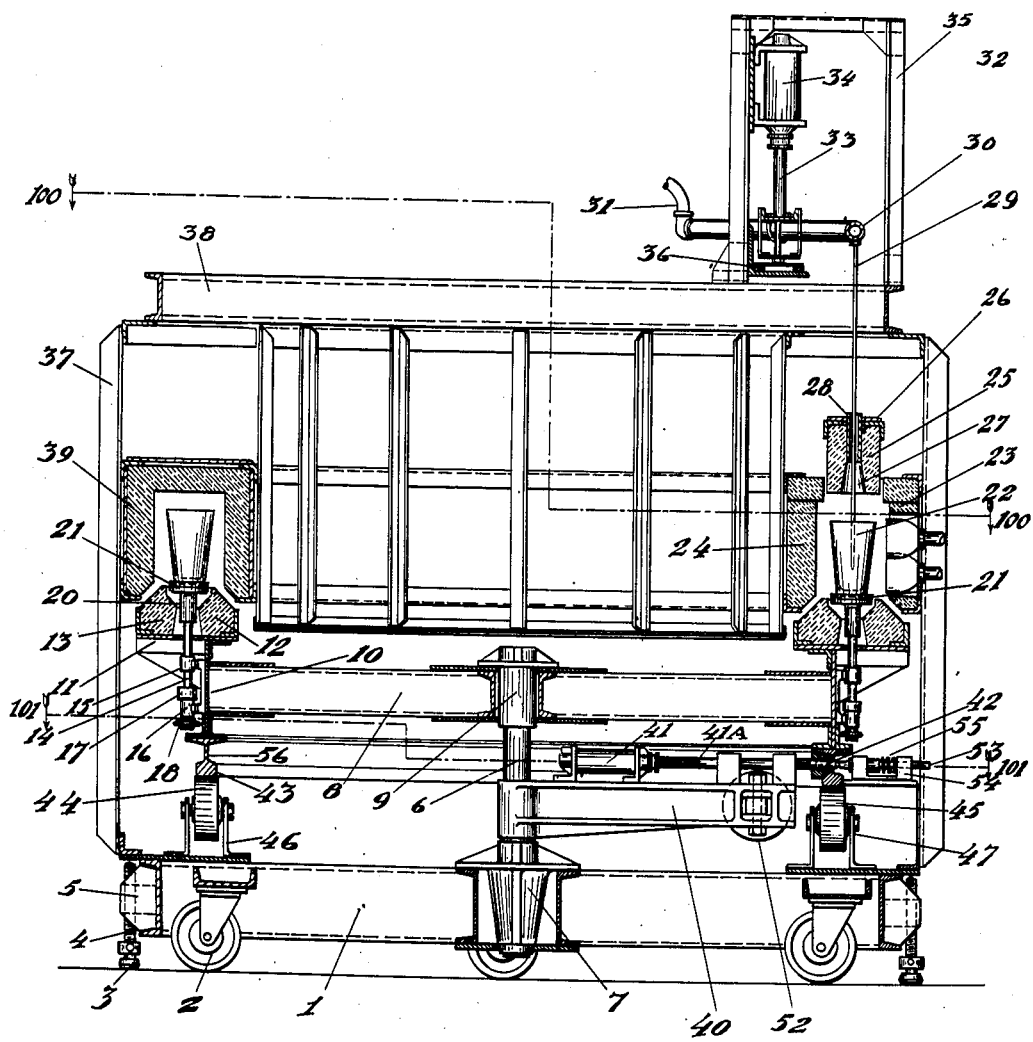

In the drawings I represents a base or frame which may conveniently be formed in a rectangular shape although this is incidental. The frame I is provided with a series of rollers, one of which is indicated by 2. The frame is also provided with a series of jacks or supporting members indicated by 3 which are provided with a threaded shank 4 arranged to turn in a nut 5 attached to frame 1 and serve to support the frame rigidly and permanently in position while the machine is operated.

In the central portion of the machine is provided a vertical shaft or spindle 6 which may be conveniently permanently located in step bearing 7 carried by frame 1. A turn-table 8 is pivoted near the upper portion of spindle 6 by bearing 9 which makes it possible to revolve table 8 as later set forth.

Table 8 may be of any desired form of construction, but for purposes of convenience it is here illustrated as consisting of a circular channel 10, carrying near its upper portion a circular flat plate 11 on which is mounted a table formed preferably from insulating refractory as indicated by members 12 and 13.

A series of vertical spindles 14 are arranged at regular intervals around channel 10 or any portion of the external periphery of table 8. The spindles 14 are mounted in a pair of bearings 15 and 16 and provided with a collar 17 so that they may rotate freely without changing their vertical position. At the lower end of the spindles 14 I may provide a sprocket 18 which is arranged to be driven by chain 19 which forms a complete loop and is arranged so as to drive the sprockets carried by all of the spindles except those in certain different positions where the work is loaded or unloaded as will later be described.

The upper end of shaft 14 extends through opening 20 in insulating refractories 12 to 13 and is provided with a cap 21 which is preferably formed to fit the contour of the lower edge of the article being heated.

It is to be understood that the description given for the construction of the spindles and associated parts applies to all the additional spindles only one to be given a number as the other parts are substantially identical. 22 indicates one of the articles being treated mounted in cap or support 21. 23 and 24 indicate refractory insulating housings surrounding the article in the heating zone while 25 indicates another refractory and insulating member serving as a cover or top to the heating zone and provided with means so it may be raised or lowered in such a manner as to maintain its lower surface close to and slightly above the upper edge of the article 22, which is being treated.

The top member 25 is provided with a vertical hole or opening 26 preferably flared as indicated by 27 near its lower end and provided with the bushing or sleeve 28 to serve as a guide and wiring member for tube air pipe 29.

Tube or air pipe 29 is connected to header 30 which is supplied with air from any outside source by means of a flexible hose 31.

Pipe header 30 is supported by frame 32 which is carried by piston rod 33 of cylinder 34 which is arranged to be actuated by compressed air or other moving means. It will be apparent, therefore, that tube or pipe 29 is in position to reciprocate in a vertical plane moving in and out of the interior of article 22 as the operation proceeds.

An auxiliary frame work 35 is provided to support cylinder 34 and a stop member 36 serves to limit the lower travel of support 32 carrying header 30.

A structural frame comprised of upright angles or equivalent members 37 carries a channel or I-beam 38 and serves to give rigidity to the structure as well as enclose and support refractory members 23 and 24 and the cooling tunnel 39.

Table 8 is caused to rotate in any desired manner and I have shown for purposes of illustration a structure comprising an oscillating arm 40 carrying an air cylinder 41 which serves to operate engaging pin 42. Rotating table 8 while pivoted on spindle 6 is supported on circular rail member 43 which rolls on a group of rolls one of which is indicated as 44 and another as 45. These rollers are supported in turn by means of bearings 46 and 47 on frame 1. Air cylinder 48 is pivoted on shaft 49 which is carried by bearing 50 in turn supported by frame 1. The piston rod 51 of air cylinder 48 is in turn pivoted by means of pin 52 to arm 40 in such a manner that when piston 51 of cylinder 48 is caused to oscillate arm 40 moves through a corresponding angle. A locating pin 53 is mounted in bearings 54 and held in position by spring 55 so as to constantly maintain a pressure on flange 56 of rail 43.

A motor 57 serves to drive sprocket 58 which in turn through chain 59 drives sprocket 60 of speed reducer 61 on the upper end of which is mounted sprocket 62 serving to drive chain 19. An idler 63 may be provided to hold the chain properly tensioned while a pair of additional idlers 64 and 65 serve to hold the chain out of contact with the sprockets on those spindles, located at the loading and unloading position of the device.

A series of burners indicated by 66 and 67 arranged around the periphery of the housing indicated by members 33 and 34 serve to apply heat in the form of a sharply focused wedge shaped flame coming to a focus very closely at the surface of the work which the flame contacts.

Burner 66, 67, etc., may be fed with combustible mixture from a series of pipes or other means which are not shown on the drawings as any commercial device may be utilized for this purpose.

In Figure 3, member 22 being heated, is shown in the normal position resting on its base and revolving at a speed which is varied to suit the results desired and the nature of the article treated, but ranging ordinarily from eight to twenty-four revolutions per minute. I have found that the smaller the articles the faster they should revolve while articles of large diameter and heavy wall preferably should revolve more slowly. I consider this an important point as in order to obtain most satisfactory results it is desirable to be able to accurately control the speed of revolution. It should also be kept in mind that the greater the wall thickness the longer the heating time and the slower the articles should revolve. The speed, however, is dependent on the composition of the glass, the temperature of the glass, the size and shape of the article so that all statements given are relative.

One of the fundamental features of this invention is the ability to cool the interior of the articles being heated on the outside thus maintaining a cold skeleton or structure which will not flow or deform. This result may be obtained in many ways, but I have found it most convenient to accomplish it by blowing a stream of cold air or steam into the interior of the article while it is being heated.

Articles having a thin wall require a very marked cooling while articles with a thick wall may require little or no cooling. Air pipes 29 serve to conduct air into the interior of the article in the type of construction shown in Figures 1, 2 and 3. As an alternate method in Figure 4, I have shown an air pipe 70 entering through an extension of the spindle thus cooling the interior of the article directly from the support providing the article is in an inverted position. In the case of Figure 4 similar numerals refer to similar parts and burner 66 is shown on edge or flatways so that the flame comes to a sharp focus on the edge of the article and immediately beneath the refractory insulating block 25A. Under these conditions, the flame heats the under surface of refractory block 25A to a high degree of intensity and a large amount of radiant heat is, therefore, reflected down on the surface being heated thus causing rapid uniform heating and obtaining the desired results.

In Fig. 7, air header 71 supplies air or other cooling medium to a series of pipes 72 provided with a goose neck 73 which ends in a nozzle 74 within the article being heated. Figure 7 is a fragmentary view designed to merely illustrate this construction and reference numbers previously given covering spindle, sprockets and other details here apply.

In Figure 6, an alternate form of construction is illustrated in that header 75 supplies a series of pipes 76 with air or other cooling medium which is at a relatively high pressure above the atmosphere. The end of pipe 76 indicated by 77 is so located in Venturi throat 78 that a large amount of room air is drawn into pipe 79 and, therefore, the cooling of article 22 takes place with relatively much smaller amounts of compressed air, thus reducing the cost of the operation.

In operating this equipment an automatic timer 80 causes compressed air to flow into the rear end of cylinder 41, thus causing piston rod 41A to move forward forcing pin 42 into a corresponding opening in the flange of rail 43 and at the same time forcing locking pin 53 out of engagement with the same hole. This operation serves to locate rotating arm 40 to circular rail 43 thus making it possible for air cylinder 48 by moving arm 40 to revolve rail 43, and therefore, table 8. I, therefore, provide a contact member 85 which serves to close an electric circuit supplying air to the rear end of cylinder 48 as shown, as pin 53 has been pushed out of engagement with rail 43 and arm 40 is securely locked to set rail 43. Cylinder 48 now pushes arm 40 and, therefore, the table through a circular arc of pre-determined length which may be the distance represented by 1, 2 and 3 pairs of spindles or more if desired. When cylinder 48 has reached the extreme end of its stroke it causes another contact 86 to be closed which serves to withdraw piston rod 41A and pin 42 thus disengaging the table from arm 40. At the same time air is applied to the upper end of cylinder 34 causing the series of air pipes 29 to enter the articles being polished, thus serving to cool their interior.

When cylinder 48 has completed its stroke and closed the contact at the end of its stroke air is then applied to the rear end of the piston in cylinder 48, causing the arm 40 to be returned to its original position, thus completing the cycle and leaving the equipment in readiness for the next cycle to be initiated by the timer.

Figure 8:
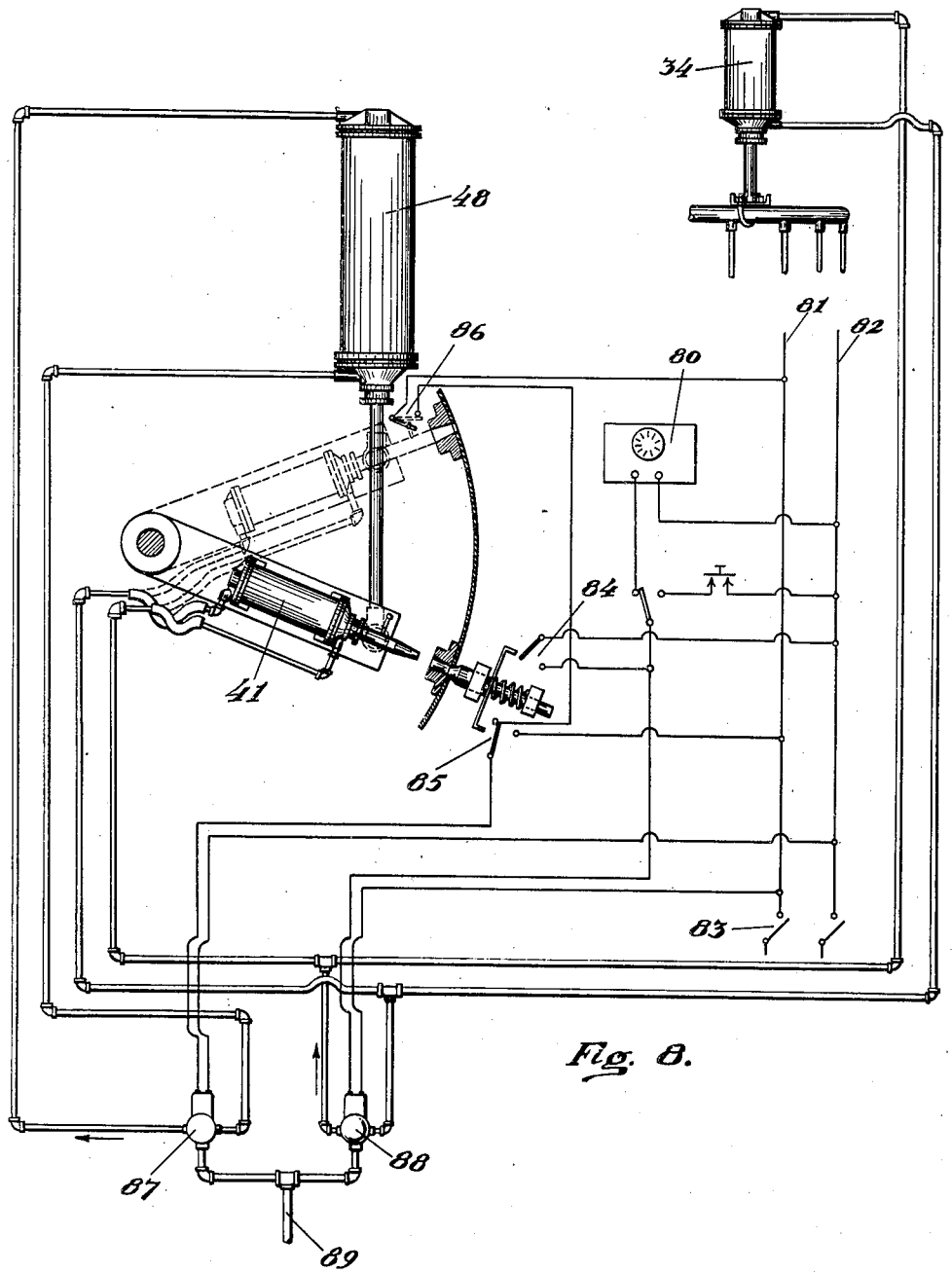
Figure 8 shows in diagram one general arrangement of piping and wiring which may accomplish the results desired.

Figure 8 shows a diagram in schematic form of one arrangement of wiring, contacts and piping which serves to give the results described.

In Figure 8, similar numerals to those used in the other figures indicate similar parts. 80 indicates an automatic timer of any commercial type now available on the market, the principle of operation being that it is actuated either by a small electric motor or a spring and at regular pre-determined periods closes a circuit starting the equipment in operation. 81 and 82 indicate the terminals of the actuating electric circuit which may be of any convenient commercial voltage and frequency. 83 indicates a switch which may be used for connecting these terminals to the power circuit.

84, 85 and 86 indicate mechanically operated limit switches as described above, while 87 and 88 indicate solenoid actuated valves controlled by the circuits above mentioned.

These solenoid valves are both of the four-way type so arranged that when power is applied to the solenoid air may pass through the valve in one direction and that when power is cut off from the valve air will pass through a different pair of outlets. The direction of the arrows on each valve indicates the direction of flow of air when the solenoids are not actuated.

The source of air is indicated as pipe 9 which supplies both solenoids. Ordinary compressed air systems ranging from 20 to 100 pounds may be employed as the equipment can be designed for any desirable commercial condition.

It will be evident that the mechanism I have described is only one of many commercial types which may be used to cause the table carrying the ware to revolve.

In essence, it is merely essential that the work being subject to heat will travel from one burner location to another more or less continuously. It is desired that the greater portion of the time be spent with the work in front of the burners and the minimum amount of time be spent in traveling from one burner position to another.

In operating my equipment an operator takes a position adjacent to support or cap 90 and places the articles to be heated successively on the cap during the interval that the machine is stationary. The same or another operator removes the finished articles from cap 91. It is understood that the table revolves in the direction shown by the arrow in Figure 2, entering the heating zone and passing in succession in contact with the flame from the burners in the heating zone. It will be apparent that the caps and spindles do not revolve in the positions 90, 91 or 92 since the chain which would cause them to revolve is held out of contact with the sprockets at these points. The chain causes the spindles to revolve, however, immediately after entering the heating zone and the revolutions continue until they leave the heating zone. During the heating operation the flame is brought to a focus practically in contact with the surface of the material and at the same time, in the case of thin walled or fragile material, a stream of cooling medium such as air or steam is passed through the cooling pipes 29 cooling the center of the article. This arrangement it will be noted permits extremely rapid forced heating of the outside surface of the glass or other article while maintaining a cooler skeleton within which will maintain the shape of the article. Without such cooling means it is extremely difficult to properly heat the article having thin walls without serious sagging or distortion. This has been a serious drawback hitherto and is a defect which has been overcome by my invention, as I am able to get a much higher rate of heating and, therefore, a much higher polish than can be obtained by other means.

My machine also makes it possible to control the rate of rotation of the articles, independent of the speed of rotation of the table. Also by means of a clutch mounted on sprocket 62 between sprockets 62 and shaft 62A, I provide that when the table turns the chain 19 will idle on shaft 62A by reason of the clutch. This construction insures that when table 11 turns the spindles will not revolve. Such a construction is desirable, but not absolutely necessary. If a clutch of this type is not provided in sprocket 62 or at some equivalent part of the drive circuit, it will be found that the spindles will rotate at a varying speed depending on whether table 11 is stationary or revolving and depending further on the direction of revolution of the table.

With the equipment shown it is possible to remove and inspect the articles being polished in the zone adjacent the driving unit (sprockets 62, etc.) as it will be noted that in this section of the table the drive chain 19 is not in contact with the sprockets carried by the spindles. In this zone also it is possible to invert the articles being polished if desired so that the bottom edge may be polished as well as the top edge. The cooling zone 39 merely provides a space of controlled cooling to permit the articles previously polished to become sufficiently hard so that they may be handled without becoming deformed. At the same time the cooling section is enclosed to avoid too rapid a rate of cooling which might otherwise cause undue strains in the case of relatively fragile articles.

It will be apparent that many various and obvious mechanical expedients may be employed to accomplish the results which I have outlined. Various methods may be utilized for cooling the interior of the articles being heated and various types and mechanisms may be employed for moving the articles past the source of heat.

It should be understood that my invention is not confined specifically to the construction shown and described as the principles are sufficiently broad to cover many mechanical equivalents of the exact disclosure.

Having now fully described my invention what I claim as new and wish to secure by Letters Patent in the United States is as follows:

1. The process of fire polishing the outer surface of a thin walled hollow article, while maintaining the article true to form, said process consisting of rotating the article with sides unsupported and directing a flame against the outer surface of said unsupported sides, thereby raising the temperature of said sides to the fire polishing point and directing a stream of cooling air into the interior of said article and against the inner surface of said sides, thus maintaining a thin cool, internal layer of glass in said sides, said cool layer serving as the exclusive support of said thin sides and preventing sagging of said walls as the outer portion of said sides approach the fusion point.

2. An apparatus for applying heat to the outside surface of a thin walled, hollow glass article, said apparatus consisting of supporting means for revolving said article, a burner arranged to direct an intensely hot flame on the outer layer of the wall of said hollow article and means arranged so as to deliver a stream of cooling air against the inside layer of the wall of said hollow article.

3. The process of heat treating hollow glass articles with thin sides, while maintaining the articles substantially true to form, which consists in directing a flame against the outer surface of the side of said hollow article, thereby raising the temperature of said outer surface to the softening point and simultaneously moving said article so that said side is subjected to heating over a large area, and simultaneously directing a stream of cooling air against the inside surface of said side thus maintaining a thin cool internal layer of glass in said side, said cool layer serving as the exclusive support of said side and preventing distortion as the outer portion of said side approaches the fusion point.

4. A heat treating apparatus consisting of a rotatable table adapted to support a hollow glass article substantially axially of said table, means for rotating said table, a burner arranged to direct a flame on the outside of said article on said rotating table, and means for delivering a stream of cooling gases into the interior of said glass article, thus heating a portion of the outside wall of said article while cooling a portion of the inner wall.

5. A heat treating machine containing a multiple of heating stations, a burner at each heating station, a series of rotatable tables carried by a movable support, said rotatable tables being adapted to support a hollow glass article being heat treated, means for causing said movable support to successively advance said rotatable tables into coincidence with said heating stations, means for rotating said tables while at said heating station, and means for delivering a stream of cooling gases into the interior of said glass article being heat treated.

6. A heat treating apparatus consisting of a rotatable table adapted to support a hollow glass article substantially axially of said table, means for rotating said table, a burner arranged to direct a flame on the outside of said glass article on said table and means for continuously introducing a stream of cooling gases into the interior of said article.

7. A heat treating apparatus consisting of a rotatable table adapted to support a hollow glass article substantially axially of said table, means for rotating said table, a burner arranged to direct a flame on the outside of said glass article, on said table, and a movable means for introducing a stream of cooling gases into the interior of said article.

8. In a heat treating machine a cooling station, a heating station, a burner arranged to supply heat for said heating station, a movable support, a rotatable table carried by said movable support, and arranged to carry a hollow article being heat treated, means for rotating said table, means for moving said support, means for delivering cooling gases into the interior of said hollow article to cool a portion of the interior thereof, and means for advancing said rotatable table from said heating station to said cooling station.

9. The process of heat treating hollow glass articles which consists in revolving said articles about an axis substantially concentric with the axis of said article, directing a flame against the outer surface of said article as it revolves, thereby intensively heating a portion of the outer surface thereof, and simultaneously directing a stream of cooling gases over the inner surface of said article, thus controllably cooling the inner surface of said article.

10. The process of heat treating hollow glass articles which consists in revolving said articles about an axis within said article, directing a flame against the outer surface of said article as it revolves, thereby heating a portion of the outer surface thereof, and simultaneously directly a stream of cooling gases over a portion of the inner surface thereby cooling a portion of said inner surface and finally controllably cooling substantially the entire article so that it may be handled without deformation.

WILLIAM A. DARRAH.